(12) United States Patent
Gesner

(10) Patent No.: US 10,776,950 B2
(45) Date of Patent: Sep. 15, 2020

(54) ALIGNMENT SYSTEM FOR IMAGING SENSORS IN MULTIPLE ORIENTATIONS

(71) Applicant: Quality Vision International Inc., Rochester, NY (US)

(72) Inventor: Eric G. Gesner, Webster, NY (US)

(73) Assignee: QUALITY VISION INTERNATIONAL INC., Rochester, NY (US)

( * ) Notice: Subject to any disclaimer, the term of this patent is extended or adjusted under 35 U.S.C. 154(b) by 0 days.

(21) Appl. No.: 16/279,815

(22) Filed: Feb. 19, 2019

(65) Prior Publication Data

US 2019/0304131 A1 Oct. 3, 2019

Related U.S. Application Data

(60) Provisional application No. 62/651,347, filed on Apr. 2, 2018.

(51) Int. Cl.
*G06T 7/73* (2017.01)
*G05B 19/401* (2006.01)
(Continued)

(52) U.S. Cl.
CPC .............. *G06T 7/74* (2017.01); *G01B 11/005* (2013.01); *G05B 19/401* (2013.01);
(Continued)

(58) Field of Classification Search
CPC .............. G01N 21/39; G01N 2021/392; C12Q 1/6809; F21V 31/04; F21V 13/02; G01B 11/005; G05B 2219/40613; G05B 2219/37563; G05B 2219/37193; G05B 19/401; G06T 7/74; G06F 3/0325
See application file for complete search history.

(56) References Cited

U.S. PATENT DOCUMENTS 4,721,388 A * 1/1988 Takagi ................. G01B 11/005
356/394
4,908,951 A * 3/1990 Gurny .................. G01B 11/005
33/1 M (Continued)

FOREIGN PATENT DOCUMENTS

JP 2014-89095 A 5/2014

OTHER PUBLICATIONS

Japan Patent Office, International Search Report and Written Opinion from PCT Int'l Appln. No. PCT/US2019/018612 (Int'l. Filing Date: Feb. 19, 2019) as completed on May 17, 2019 and dated May 28, 2019.

*Primary Examiner* — Sang H Nguyen
(74) *Attorney, Agent, or Firm* — Jodi A. Reynolds, Esq.; Harter Secrest & Emery LLP

(57) ABSTRACT

An alignment system for an imaging sensor of a coordinate measuring machine incorporates a reference surface associated with a stage of the measuring machine but instead of imaging the reference surface as a location marker, the reference surface is incorporated into a combined imaging system together with the imaging sensor for imaging a feature associated with the imaging sensor. The imaged feature can be an internal part of the imaging sensor, such as an internal aperture, or an external feature in a fixed relationship with the imaging sensor, such as a lens hood.

14 Claims, 6 Drawing Sheets

(51) Int. Cl.
*G01B 11/00* (2006.01)
*G06F 3/03* (2006.01)
(52) U.S. Cl.
CPC .. *G06F 3/0325* (2013.01); *G05B 2219/37193* (2013.01); *G05B 2219/37563* (2013.01); *G05B 2219/40613* (2013.01); *G06T 2207/30204* (2013.01)

(56) References Cited

U.S. PATENT DOCUMENTS

| | | | | |
|---|---|---|---|---|
| 5,615,489 | A * | 4/1997 | Breyer | G01B 5/012 |
| | | | | 33/503 |
| 2005/0259271 | A1* | 11/2005 | Christoph | G01B 5/012 |
| | | | | 356/601 |
| 2010/0253931 | A1* | 10/2010 | Meier | G01B 11/002 |
| | | | | 356/4.01 |
| 2013/0027544 | A1* | 1/2013 | Chang | G01B 21/04 |
| | | | | 348/135 |
| 2014/0107958 | A1* | 4/2014 | Hayashi | G01B 9/02072 |
| | | | | 702/95 |
| 2014/0109420 | A1 | 4/2014 | Kurihara et al. | |
| 2016/0103222 | A1* | 4/2016 | Bockem | G01B 11/005 |
| | | | | 356/5.01 |
| 2016/0258752 | A1* | 9/2016 | Hornung | G01S 17/66 |
| 2016/0370172 | A1* | 12/2016 | Christoph | G01B 11/007 |
| 2017/0160077 | A1* | 6/2017 | Featherstone | G01B 11/24 |
| 2018/0066933 | A1* | 3/2018 | Seitz | G02B 6/0001 |
| 2018/0073871 | A1 | 3/2018 | Polidor et al. | |
| 2018/0080766 | A1* | 3/2018 | Johnson | G02B 9/34 |

* cited by examiner

ALIGNMENT SYSTEM FOR IMAGING SENSORS IN MULTIPLE ORIENTATIONS

BACKGROUND OF THE INVENTION

1. Field of the Invention

The invention relates to coordinate measuring machines and particularly to such machines that collect measurement data from test objects using a plurality of sensors including sensors that collect data by imaging the test objects.

2. Description of the Related Art

Coordinate measuring machines with multiple sensors for measuring test objects often reference the data collected by the different sensors within a common coordinate system or reference frame for collecting relatable data regarding the test objects. As such, the relative positions and orientations of the sensors are determined. In the case of imaging sensors, information concerning the magnification, focal plane, coordinate position, rotational orientation of camera pixels, and optical axis of the respective sensors is determined.

One approach is to use the various sensors to collect measurements of a reference artifact, such as a reference sphere, from multiple orientations while monitoring relative movements of the sensors along or about coordinate measurement axes of the machines. For example, the center of a reference sphere can be defined as the center or other given location within a coordinate reference frame. As each different measurement sensor collects enough information to determine the center of the reference sphere, the measured center positions from each sensor can be equated to each other.

Imaging sensors often measure features of test objects and other artifacts by identifying boundaries of image contrast within the images collected from the artifacts. Different types of illumination produce different types of image contrast. For example, the equator of a reference sphere can be detected within a collected image by illuminating the sphere in contrast to a darker background or by illuminating the background in contrast to a darker view of the sphere. The background can be illuminated at the expense of the sphere by backlighting or by favoring the reflection of light from the background. For example, coaxial illuminators can generate image contrast by retroreflecting light from a surface beneath or behind the reference sphere. Oblique illumination tends to produce less accurate results by casting shadows over edges or allowing off-axis rays to enter the imaging system from surfaces just above or below the equator intended to be detected.

Because the detection of artifact boundaries is sensitive to the type of illumination used, different positions and orientations of the imaging sensors can be difficult to calibrate among each other, which add an amount of uncertainty to the desired calibrations.

SUMMARY OF THE INVENTION

Instead of imaging a reference sphere to determine its boundaries, a reflective reference sphere or other convex reflective surface shape can be arranged in accordance with certain embodiments disclosed herein to operate as a component of the imaging sensor, whereby the imaging sensor collects an image of a feature that is a part of the imaging sensor itself or a feature having an otherwise defined relationship with the imaging sensor (e.g., exhibits rigid body motion with the imaging sensor). The convex reflective reference surface allows for imaging features within its line of sight, which can include features surrounding the optical axis of the imaging sensor. For example, illumination conveyed through the imaging optics of the imaging sensor can illuminate an internal feature among the imaging optics, such as an aperture stop, and an image of the internal feature can be reflected by the reference surface to produce an image of the internal feature at the image plane of the imaging sensor. Alternatively, illumination conveyed outside of the imaging optics of the imaging sensor can illuminate an external feature of the imaging sensor, such as a lens hood, and an image of the external feature can be reflected by the reference surface to produce an image of the external feature at the image plane of the imaging sensor.

An alignment system for a coordinate measuring machine is envisioned where a convex reflective reference surface, such as a spherical reflector, is mounted on a test object mounting stage, such as a worktable, and one or more sensors, including an imaging sensor, are mounted on a relatively movable sensor stage, such as an articulated arm. Either or both of the test object and sensor stages can be moved to effect the ranges of translational and rotational motions required between the test object and the sensors to acquire desired measurement data from various test objects.

For aligning and otherwise calibrating the imaging sensor within a reference frame of the coordinate measuring machine, a feature of the imaging sensor having a predefined relationship with the imaging sensor is selected as a fiducial marker. Preferably, this feature surrounds the optical axis of the imaging sensor in a concentric manner and can be located internally or externally of the imaging optics of the imaging sensor. A convex reflective reference surface, such as a spherical reflector, is mounted on a test object mounting stage. The convex reflective reference surface preferably has a convex shape facing the imaging sensor for two reasons. First, an image of the fiducial marker can be captured by the imaging sensor over a wider range of relative positions between the imaging sensor and the convex reflective reference surface and the convex reflective reference surface can contribute a measure of optical power that can be used to change the effective focal length of the imaging sensor. When so arranged to collect images through the convex reflective reference surface, the fiducial marker rather than the convex reflective reference surface is located at the object plane of the combined optic defined by the imaging sensor and the convex reflective reference surface.

The fiducial marker, as a component influencing the passage of light through the imaging optics, can be directly illuminated from an internal source filling the aperture of the imaging sensor. The fiducial marker, as component that does not similarly influence the passage of light through the imaging optics, can be directly illuminated from an external light source, such as from a ring light surrounding the imaging sensor, or could be self-illuminated. Regardless of the way in which the fiducial marker is illuminated, the imaging sensor and the convex reflective reference surface are sufficiently aligned so that the fiducial marker is visible within the line of sight of the imaging sensor as reflected by the convex reflective reference surface.

The form and placement of the fiducial marker can be matched to the form of its illumination. As an aperture, for example, the fiducial marker preferably contains a sharp edge as a well-defined obstruction creating secondary sources of illumination by diffraction. As an external feature of the imaging sensor, the fiducial marker, can also be considered as an alignment tool, which can take a variety of forms so long as the alignment tool can be illuminated sufficiently to provide a feature, such as a circle, that has sufficient contrast to allow it to be measured using the image processing of the imaging sensor.

Particularly when coordinate measuring machines employ multiple sensors for measuring the same or different features of test objects, the sensors are preferably related to a common reference frame of the coordinate measuring machine, which is generally defined with respect to a test object mounting stage and selected axes of machine motion. As a sensor of a coordinate measuring machine, the ability to image the fiducial marker of the imaging sensor through the convex reflective reference surface that is fixed to a test object mounting stage of the coordinate measuring machine allows for relating the imaging sensor to the reference frame of its coordinate measuring machine. For example, the position and orientation of the optical axis of the imaging sensor within the reference frame can be determined directly or indirectly with respect to another sensor of the coordinate measuring machine whose position and orientation are known. In addition, information concerning the magnification, focal plane, and rotational orientation and scale of camera pixels can be determined.

Assuming, for example, that the convex reflective reference surface is a spherical reflector and the fiducial marker has an annular shape surrounding the optical axis of the imaging sensor, the center of the image of the fiducial marker captured by the imaging sensor yields information concerning the location of the optical axis of the imaging sensor with respect to the center of the spherical reflector. Although the imaging sensor and the fiducial marker move as a single rigid body, relative translation of the imaging sensor with respect to the spherical reflector moves the image of the fiducial marker within the imaged field of view of the imaging sensor. The relative displacement of the fiducial marker within the imaged field of view yields information concerning the spacing and orientation of the imaging sensor pixels with respect to the axis of motion. Similar types of measurements can be taken at different angular positions of the imaging sensor with respect to the spherical reflector where the fiducial marker of the imaging sensor is translated into the imaged field of view of the imaging sensor. Relative offsets of the fiducial marker within the imaged field of view along predefined motion axes yield information concerning image magnification and rotational alignments.

Comparative measures with other sensors, such as a tactile sensor mounted in a fixed position with the imaging sensor on the same articulated arm, can be established by comparing measurements of the fiducial marker imaged through the spherical reflector with measurements involving direct contact between the tactile probe and the spherical reflector. For example, once the center of the spherical reflector is determined in relation to the tactile sensor by conventional means, the offset from this position can be measured by the amount of relative motion required to similarly locate the center of the fiducial marker within the imaged field of view of the imaging sensor. Further motions for moving the fiducial marker across the imaged field of view of the imaging sensor can be used for relatively orienting and scaling the images produced by the imaging sensor.

BRIEF DESCRIPTION OF THE DRAWING FIGURES

The invention can be better understood with reference to the following detailed description together with the appended illustrative drawings in which like elements are numbered the same.

Figure 4A:
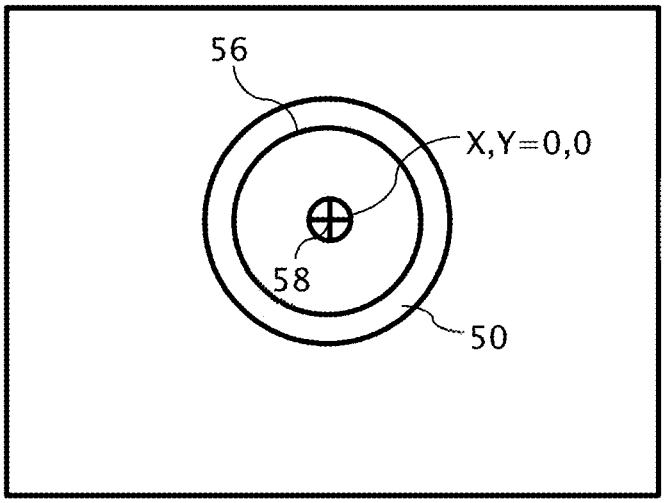
Figure 4B:
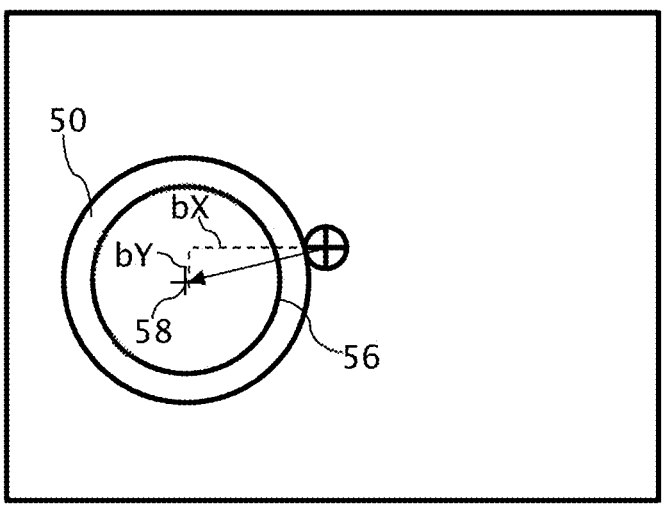
Figure 4C:
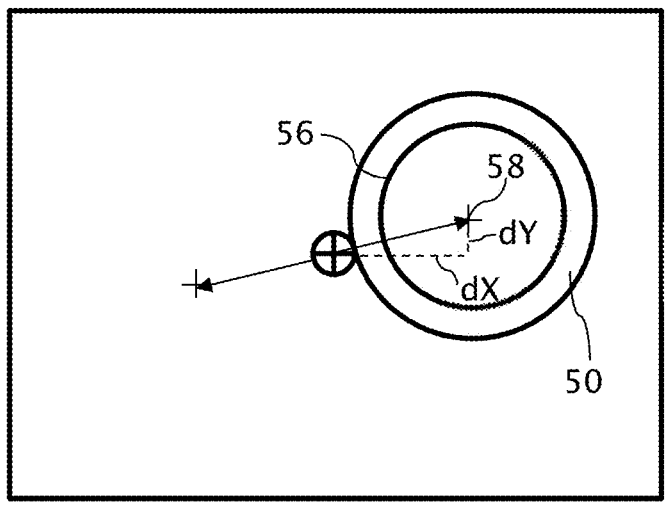

FIGS. 4A-4C present a sequence of schematic images of the fiducial marker at three different relatively displaced positions of the imaging sensor with respect to the spherical reflector along a motion axis of the coordinate measuring machine.

Figure 5:
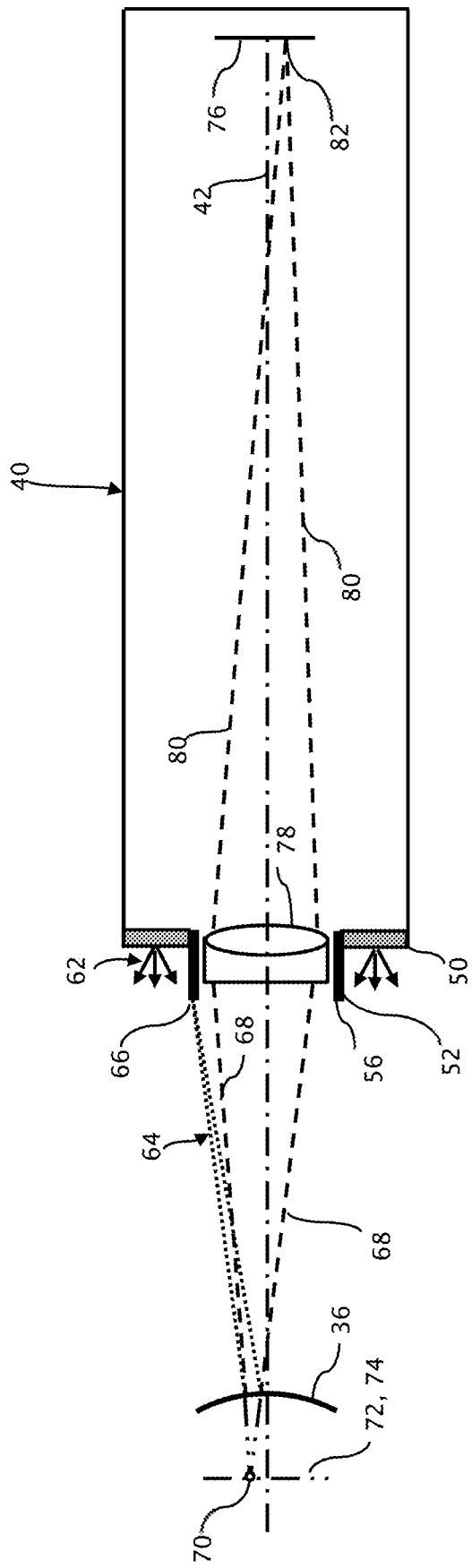

FIG. 5 is a diagram of a fiducial marker illumination system and imaging sensor arranged for imaging the fiducial marker by refection from a convex reflective surface.

Figure 6:
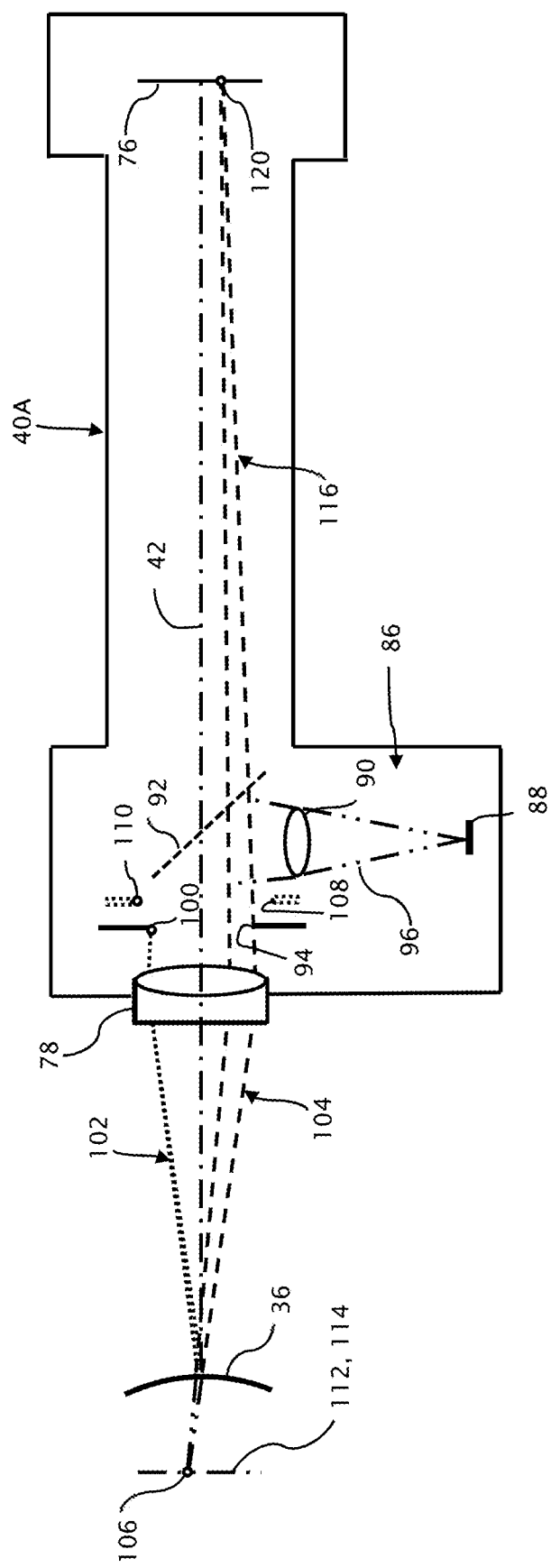

FIG. 6 is a diagram of a through-the lens illumination system and imaging sensor arranged for imaging an internal aperture of the imaging sensor by refection from a convex reflective surface.

DETAILED DESCRIPTION OF THE INVENTION

Figure 1:
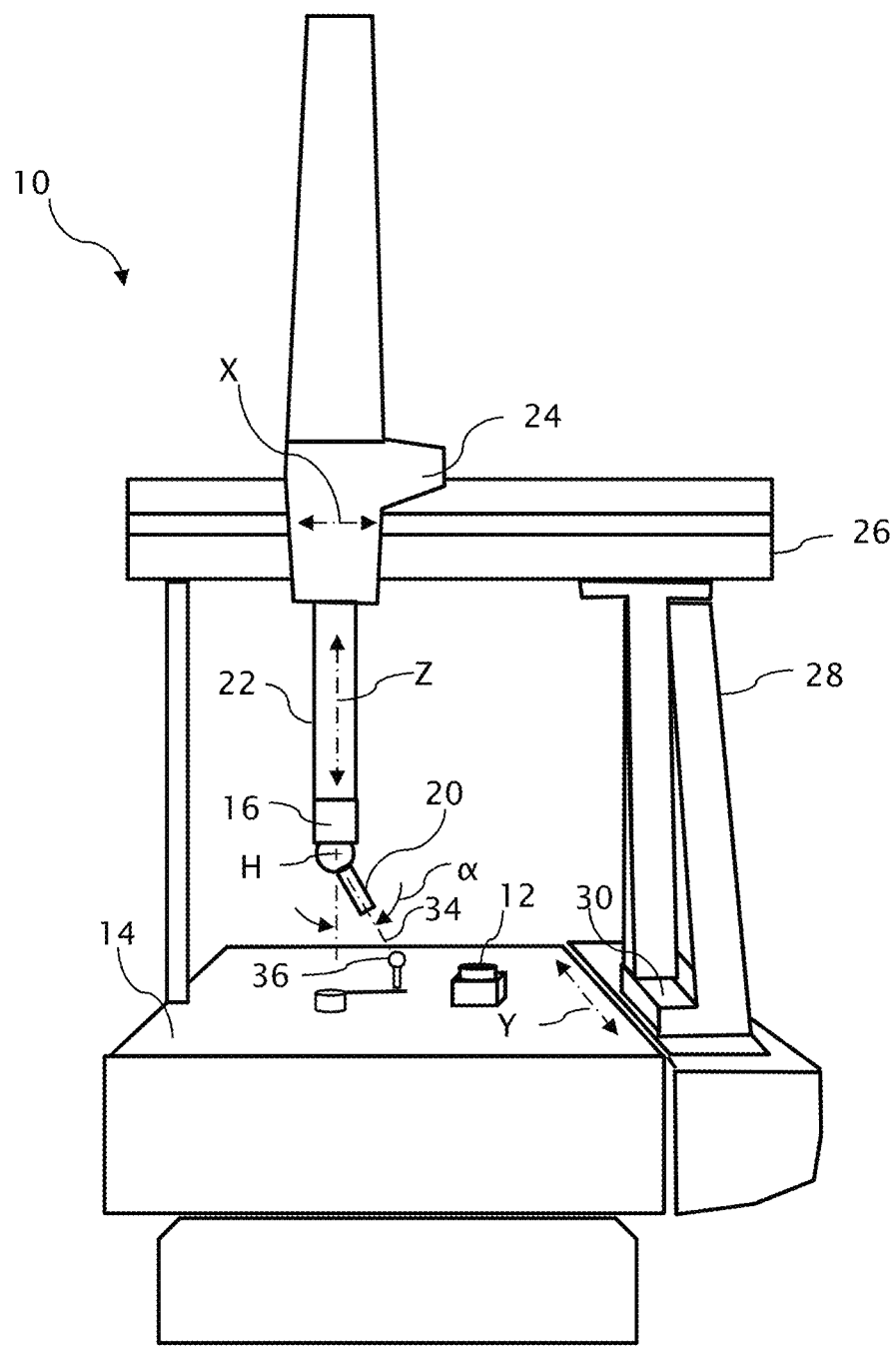
FIG. 1 is a front perspective view of a coordinate measuring machine with a generic sensor mounted from an articulated arm with a spherical reflector as a convex reflective reference surface mounted together with a test object on a worktable of the coordinate measuring machine.

A coordinate measuring machine 10 is depicted in one of many possible configurations for measuring a test object 12 mounted on a worktable 14. An articulated arm 16 supports a generic sensor 20, which could be arranged as an imaging sensor, for compound rotations about two orthogonal axes that extend within respective vertical and horizontal planes. For example, the articulated arm 16 supports rotations of the sensor 20 about a vertical Z axis as well as about a horizontal axis H that can be oriented in any direction within the horizontal plane depending upon the angular position of the sensor 20 about the vertical Z axis. In the position shown, the horizontal H axis extends out of the page in alignment with a horizontal Y axis, and the sensor 20 is inclined about the horizontal H axis through an angle α of approximately 30 degrees. Rotations of the sensor 20 through the angle α about the horizontal H axis are measured with respect to the Z axis, and rotations of the sensor 20 through an angle β (not shown) about the Z axis are measured with respect to a horizontal X axis. Thus, the angle β would be equal to 0 degrees in FIG. 1.

The articulated arm 16 is carried by a ram 22 that is translatable along the Z axis through a supporting saddle 24. A bridge 26 supports translation of the saddle 24 together with the ram 22 along the horizontal X axis. At least one pillar 28 supports the bridge 26 above the worktable 14 on a carriage 30 that is translatable along the horizontal Y axis. Thus, the sensor 20 is translatable relative to the test object 12 along three linear axes X, Y, and Z and is rotatable relative to the test object 12 about two rotational axes Z and H, wherein the H axis itself rotatable about the Z axis for pointing the sensor 20 in any desired direction within the supported ranges of travel. More, fewer, or different motion axes can be provided for measuring the test object 12 with the sensor 20, and the motion axes can impart the desired motions to either or both the test object 12 or the sensor 20 in any convenient way.

Preferably, optical encoders or other measuring instruments monitor relative displacements of the sensor 20 with respect to the test object 12 or the worktable 14, more generally, along the three linear axes X, Y, Z and the two rotational axes Z and H. Each of the motion axes are preferably motor driven under the control of a computer that derives feedback from the encoders. The monitored displacements can also be incorporated into the measurements taken for relating different measurements to each other within a common frame of reference.

The sensor 20 arranged as an imaging sensor can provide for capturing two dimensional images of the test object 12 from which precise measurements of features of the test object 12 can be made within its field of view. However, for relating relatively displaced measurements taken by such an imaging sensor to each other and to measurements taken by other sensors of the coordinate measuring machine 10, the images captured by the imaging sensor must be related to a broader frame of reference that can include the motion axes of the coordinate measuring machine 10 as well as relationships of the sensors to each other. For example, the sensor 20 as an imaging sensor typically includes an optical axis 34 along which its images are captured, whose position and orientation within a common frame of reference can be used to relate the imaging sensor measurements to the broader frame of reference within which other measurement data is captured. Also relevant to the broader frame of reference is the orientation of the images about the optical axis 34, the magnification or scale of the images, and the location along the optical axis 34 of the focal plane from which the images are extracted.

While capturing images of a known artifact in a given position on the worktable 14 can provide a common reference to which the relevant characteristic of the imaging sensor can be related, difficulties associated with maintaining similar illuminations of the known artifact in different positions and orientations of the imaging sensor can lead to inconsistent results or undesirable complications. To avoid these shortcomings, the coordinate measuring machine 10 is arranged to relate the sensor 20 as an imaging sensor to an artifact shown in the form of a spherical reflector 36 in a different way.

Figure 2:
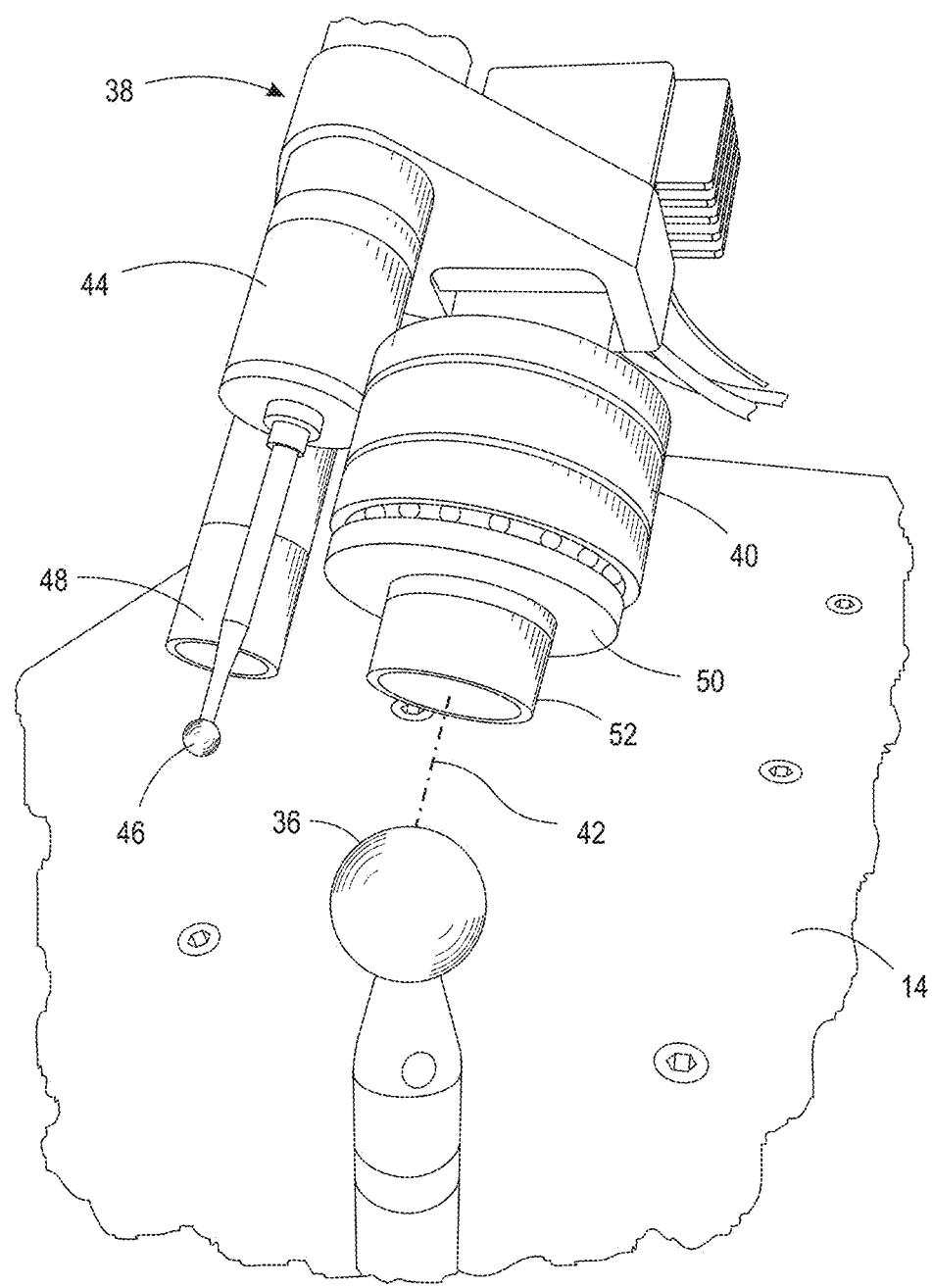
FIG. 2 is an enlarged perspective view of a multi-sensor head, including an imaging sensor as one of a plurality of sensors that are mounted together from the articulated arm of the coordinate measuring machine.

An enlarged view of a multi-sensor head 38 as a substitute for the generic sensor 20 is shown in FIG. 2. The multi-sensor head 38, which includes three different sensor modules, is intended to be supported from the same articulated arm 16 above the worktable 14. A first of the sensor modules is an imaging sensor 40 having an optical axis 42, a second of the sensor modules is a touch probe 44 having an extended stylus 46, and a third of the sensor modules is a depth-sensing laser 48.

The imaging sensor 40 includes a ring light 50, which is generally used for illuminating test objects, such as the test object 12, but is also used for illuminating a fiducial marker in the form of an opaque lens hood 52, which is also centered about the optical axis 42. In the position shown, the imaging sensor 40 is aligned with the spherical reflector 36 that is supported above the worktable 14. Similar to a conventional convex mirror, the spherical reflector 36 has a specular surface capable of producing virtual images along various lines of sight for the imaging sensor 40. Along a line of sight coincident with the optical axis 42 of the imaging sensor 40, the spherical reflector 36 produces a virtual image of the illuminated lens hood 52. The imaging sensor 40 is focused at the location of the virtual image behind the spherical reflector 36 for relaying the virtual image apparent from an image plane of the spherical reflector 36 to an image plane of the imaging sensor 40 at which a real image of the lens hood 52 is captured. That is, the object plane of the imaging sensor 40 is positioned coincident with the image plane of the spherical reflector 36, so that together, the lens hood 52 is located in the object plane of the combined optical system that includes both the imaging sensor 40 and the spherical reflector 36.

Figure 3:
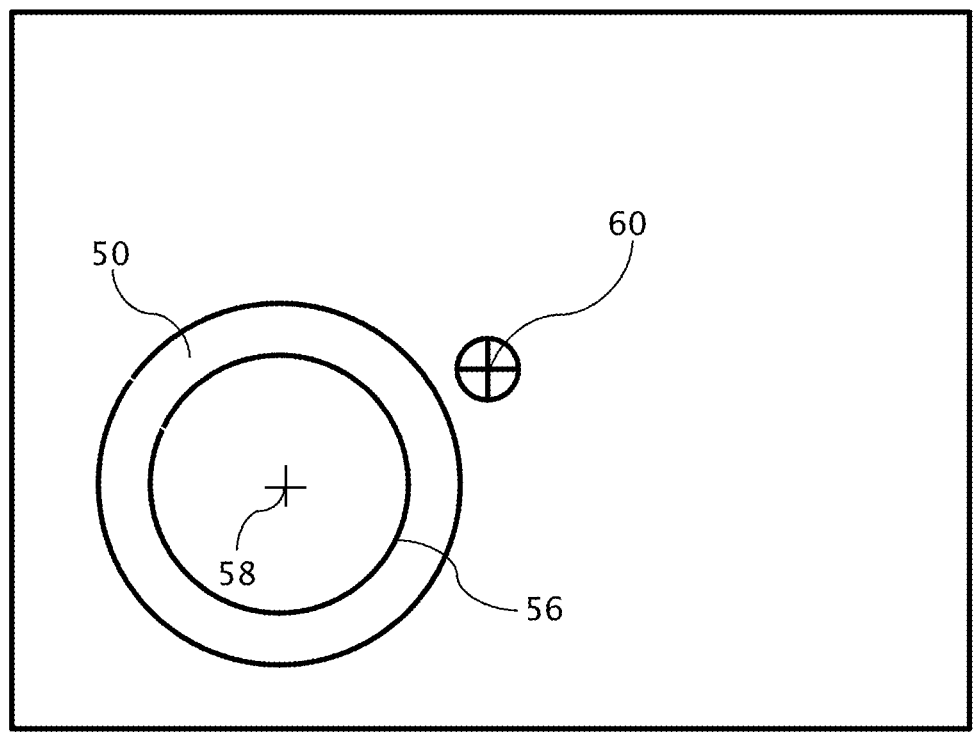
FIG. 3 is a schematic image of a fiducial marker in the form of a lens hood of the imaging sensor imaged in contrast to illumination from a ring light upon reflection from the spherical reflector.

A schematic image of the lens hood 52 as captured by the imaging sensor 40 is shown in FIG. 3. Only an outer peripheral edge 56 of the lens hood 52 is apparent in FIG. 3 as a boundary blocking light from the surrounding ring light 50. The light contrast at the edge 56 of the imaged lens hood 52 allows for the identification of points within the image that lie along the edge. From these points, a center 58 of the imaged lens hood 52 can be determined and compared to a center 60 of the imaged field of view as an indication of the offset of the optical axis 42 of the imaging sensor 40 from the center of the spherical reflector 36.

Relative displacements of the image of the fiducial marker, e.g., the lens hood 52 by recorded motions imparted by the motion axes of the coordinate measuring machine allow for determining the angular orientation of the imaged field of view of the imaging sensor 40 with respect to the machine axes and the scaling or magnification of the displacements within the imaged field of view. For example, FIGS. 4A-4C depict schematic images of the reflected lens hood 52, which is identified by its outer peripheral edge 56, at three relatively displaced positions of the imaging sensor 40 along the X axis of the coordinate measuring machine 10. Here, the optical axis 42 of the imaging sensor 40 is aligned with the Z axis of the coordinate measuring machine (i.e., angles $\alpha$ and $\beta$ are set to zero degrees).

In the view of FIG. 4A, the peripheral edge 56 of the lens hood 52 is centered within the imaged field of view at a position that aligns the optical axis 42 of the imaging sensor 40 through the center of the spherical reflector 36—a position referenced as X and Y coordinate values equal to zero. FIG. 4B is representative of the imaging sensor 40 being displaced in a negative direction along the X axis of the machine 10 by an amount aX, such as by translation of the saddle 34 along the bridge 26 of the coordinate measuring machine. The translation appears within the imaged field of view of the imaging sensor 40 as a displacement of the calculated center 58 of the imaged lens hood 52 through orthogonal detector plane measurements bX and bY. Similarly, FIG. 4C is representative of the imaging sensor 40 being displaced in a positive direction along the X axis of the machine 10 by an amount cX resulting in a displacement of the calculated center 58 of the imaged lens hood 52 through orthogonal detector plane measurements dX and dY. From these measures, relative rotation of the imaged field of view of the imaging sensor 40 with respect to the X axis of the coordinate measuring machine (in radians) can be calculated from the expression $(dY-bY)/(aX-cX)$. Similarly, any percentage error in the anticipated pixel spacing within the imaged field of view, as change in magnification for example, can be calculated from the expression $((dX-bX)/(aX-cX))/100$. That is, for matching displacements within the imaged field of view to the actual displacements of the imaging sensor, the anticipated pixel spacing can be reduced by the calculated percentage.

In the diagram of FIG. 5, the ring light 50 of the imaging sensor 40, which functions as an illuminator, emits a range of scattered light rays 62, and some of these rays 62 illuminate the outer peripheral edge 56 of the lens hood 52. The spherical reflector 36, which is depicted functionally as a convex mirror, is positioned along the optical axis 42 of the imaging sensor 40 in an orientation facing the imaging sensor 40. Thus, the spherical reflector 36 is in a position for receiving light that is scattered from the outer peripheral edge 56 of the lens hood 52. Light rays 64 represent two rays scattered from an object point 66 on the outer peripheral edge 56 in a direction toward the spherical reflector 36. The scattered light rays 64 are reflected from the convex reflective surface of the spherical reflector 36 as further diverging light rays 68 in a direction toward a detector 76 of the imaging sensor 40. Given the reflective optical power of the spherical reflector 36, the reflected rays 68 appear to diverge from a virtual point 70 located behind the convex reflective surface of the spherical reflector 36. Similar virtual points can be formed in a virtual plane 72 for object points along the entire outer peripheral edge 56 of the lens hood 52. The virtual plane 72 is located in a position determined by the distance of the spherical reflector 36 from the outer peripheral edge 56 of the lens hood 52 and the radius of curvature of the spherical reflector 36 as commonly found for convex mirrors. The image of the outer peripheral edge 56 of the lens hood 52 is reduced in size in accordance with the ratio of an image distance (along the optical axis) from the virtual plane 72 to the front of the spherical reflector 36 to an object distance (along the optical axis) from the front of the spherical reflector 36 to the outer peripheral edge 56 of the lens hood 52.

For incorporating the spherical reflector 36 as a part of an enlarged imaging system with the imaging sensor 40, the imaging sensor 40 is relatively positioned with respect to the spherical reflector 36 so that within the field of view of the imaging sensor 40, the virtual plane 72 of the spherical reflector 36 substantially corresponds to an object plane 74 of the imaging sensor 40. The resulting alignment of the planes 72 and 74 allows for the outer peripheral edge 56 of the lens hood 52 to be imaged onto the detector 76 of the imaging sensor 40. For example, the object point 66 on the outer peripheral edge 56, which is first imaged by the spherical reflector 36 to the virtual point 70, is relayed by the reflected light rays 68 through a lens 78 of the imaging sensor 40, where the rays 68 are converted into converging rays 80 that are focused onto the detector 76 at an image point 82. Thus, the object plane of the folded imaging system combining the spherical reflector 36 with the imaging sensor 40 is located at the outer peripheral edge 56 of the lens hood 52, which is imaged onto the detector 76. FIGS. 3 and 4A-4C depict examples of such imaging.

The diagram of FIG. 6 also depicts an imaging system combining an imaging sensor 40A with the spherical reflector 36 but features a different illumination system for illuminating a fiducial marker located among the imaging optics of the imaging sensor 40A. A through-the-lens illuminator 86 includes a light source 88, a beam shaping optic 90, and a beamsplitter 92 for filling an internal aperture 94, such as an aperture stop, with a diverging light beam 96. Some of this light is scattered from a peripheral edge of the internal aperture 94. For example, rays 102 are scattered from an object point 100 on the peripheral edge of the internal aperture 94. The scattered rays 102 are refracted by the lens 78 en route to the spherical reflector 36. As such, the rays 102 approaching the spherical reflector 36 appear to diverge from a corresponding point 110 on a pupil 108 that is an optical image of the aperture 94 as seen through the lens 78.

The rays 102 reflect from the convex reflective surface of the spherical reflector 36 as the further diverging light rays 104, which appear to diverge from a virtual point 106 behind the convex reflective surface of the spherical reflector 36. Similar virtual points can be formed in a virtual plane 112 for object points along the entire peripheral edge of the internal aperture 94. The virtual plane 112 is located behind the convex reflective surface of the spherical reflector 36 in a position determined by the distance of the spherical reflector 36 from the internal aperture 94 (as manifest in the pupil 108) and the radius of curvature of the spherical reflector 36.

Similar to the imaging system of FIG. 5, the imaging sensor 40A is relatively positioned with respect to the spherical reflector 36 so that within the field of view of the imaging sensor 40A, the virtual plane 112 of the spherical reflector 36 substantially corresponds to an object plane 114 of the imaging sensor 40A. The resulting alignment of the planes 112 and 114 allows for the peripheral edge of the internal aperture 94 to be imaged onto the detector 76 of the imaging sensor 40A. For example, the spherical reflector 36 images the pupil of the object point 100 on the peripheral edge of the internal aperture 94 to the virtual point 106. The reflected light rays 104 that appear to diverge from the virtual point 106 are directed back through the lens 78 of the imaging sensor 40A, where the rays 104 are converted into converging rays 116 that are focused onto the detector 76 at an image point 120.

The various operating parameters of the imaging sensor 40A and the spherical reflector 36 are set to enable at least some of reflected light rays 104 and their successors 116 to pass through the internal aperture 94 en route to the detector 76. While the pupil 108 is shown behind the aperture 94 and lens 78, which represents a simplified version of a camera's imaging system, the size and position of the pupil can vary depending upon the layout and design of the imaging system.

Preferably the entire aperture or other fiducial marker is imaged onto the detector 76 for locating the center of the imaged fiducial marker. However, the center can still be found by identifying at least three distinct points on the imaged boundary of a circular fiducial marker. Thus, even a partial image of the fiducial marker could be used to determine the center of the imaged fiducial marker, and the fiducial marker itself could comprise a structure minimally capable of being imaged at three distinct points for locating the intended center of the fiducial marker.

The disclosed examples and features of the examples are illustrative of the various combinations, variations, modifications, and substitutions that will be apparent to those of skill in the art in accordance with the overall teaching of this disclosure including unforeseen developments that are subsequently made in the art.

The invention claimed is:

1. A method of aligning an imaging sensor within a reference frame of a coordinate measuring machine comprising steps of:

illuminating a fiducial marker, which is a component of the image sensor, and having a defined relationship with the imaging sensor;

relatively moving the imaging sensor with respect to a convex reflective reference surface having a defined relationship with a test object mounting stage of the coordinate measuring machine so that an image of the fiducial marker as reflected by the convex reflective reference surface is positioned within the imaged field of view of the imaging sensor;

further relatively moving the imaging sensor with respect to the convex reflective reference surface for translating the image of the fiducial marker across a portion of the imaged field of view of the imaging sensor; and relating the displacement of the image of the fiducial marker across the imaged field of view of the imaging sensor to at least one of (a) a magnification of the fiducial marker by imaging sensor together with the convex reflective reference surface and (b) an orientation of the imaging sensor within the reference frame of the coordinate measuring machine.

2. The method of claim 1 wherein the fiducial marker is located among imaging optics of the imaging sensor, and the step of illuminating includes conveying light along a path through the imaging optics for illuminating the fiducial marker.

3. The method of claim 2 wherein the fiducial marker is an aperture stop of the imaging sensor.

4. The method of claim 1 in which the step of illuminating the fiducial marker includes illuminating the fiducial marker with an external light sources outside a light path through imaging optics.

5. The method of claim 4 in which the fiducial marker is arranged for rigid body motion with the imaging sensor.

6. The method of claim 5 in which the fiducial marker is a lens hood carried by the imaging sensor.

7. The method of claim 1 in which the step of illuminating a fiducial marker includes scattering light from an edge of the fiducial marker.

8. The method of claim 1 in which the imaging sensor includes imaging optics for conveying an image of the fiducial marker, the imaging optics define an optical axis of the imaging sensor, and the fiducial marker is centered about the optical axis of the imaging sensor.

9. The method of claim 1 in which the step of relatively moving the imaging sensor includes relatively positioning the fiducial marker at an object plane from which light illuminating the fiducial marker is reflected by the convex reflective reference surface and then conveyed by imaging optics of the imaging sensor to an image plane of the imaging sensor.

10. The method of claim 9 in which the convex reflective reference surface has a convex shape facing the imaging sensor.

11. The method of claim 10 in which the convex reflective reference surface has a spherical shape.

12. The method of claim 1 in which the step of further relatively moving the imaging sensor with respect to the convex reflective reference surface includes measuring one or more distances over which the imaging sensor is relatively moved and measuring one or more distances over which the image of the fiducial marker moved across a portion of the imaged field of view of the imaging sensor.

13. The method of claim 12 in which the step of relating the displacement of the fiducial marker across the imaged field of view of the imaging sensor includes relating the one or more distances over which the image of the fiducial marker moved across a portion of the imaged field to the one or more distances over which the imaging sensor is relatively moved for measuring magnification of the imaging sensor together with the convex reflective reference surface.

14. The method of claim 12 in which measures of the one or more distances over which the image of the fiducial marker moved across a portion of the imaged field include coordinate measures in two dimensions, and the step of relating the displacement of the fiducial marker across the imaged field of view of the imaging sensor includes relating the coordinate measure in two dimensions to the orientation of the imaging sensor within the reference frame of the coordinate measuring machine.

* * * * *